United States Patent
Tohne

(10) Patent No.: US 9,154,654 B2
(45) Date of Patent: Oct. 6, 2015

(54) DATA PROCESSING DEVICE, IMAGE FORMING DEVICE, AND DATA PROCESSING METHOD

(71) Applicant: Oki Data Corporation, Tokyo (JP)

(72) Inventor: Toshio Tohne, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/497,407

(22) Filed: Sep. 26, 2014

(65) Prior Publication Data

US 2015/0092213 A1 Apr. 2, 2015

(30) Foreign Application Priority Data

Sep. 30, 2013 (JP) ................................. 2013-204147

(51) Int. Cl.
*H04N 1/00* (2006.01)
*H04N 1/21* (2006.01)

(52) U.S. Cl.
CPC ....... *H04N 1/00411* (2013.01); *H04N 1/00387* (2013.01); *H04N 1/00389* (2013.01); *H04N 1/00395* (2013.01); *H04N 1/00408* (2013.01); *H04N 1/00435* (2013.01); *H04N 1/00474* (2013.01); *H04N 1/00482* (2013.01); *H04N 1/00506* (2013.01); *H04N 1/00517* (2013.01); *H04N 1/00965* (2013.01); *H04N 1/21* (2013.01); *H04N 2201/0094* (2013.01)

(58) Field of Classification Search
CPC .......... H04N 1/00411; H04N 1/00387; H04N 1/00474; H04N 1/00408; H04N 1/21; H04N 2201/0094; H04N 1/00389; H04N 1/00395; H04N 1/00435; H04N 1/00482; H04N 1/00506; H04N 1/00517; H04N 1/00965

USPC .................................................. 358/1.1, 1.13
See application file for complete search history.

(56) References Cited

U.S. PATENT DOCUMENTS

| | | | |
|---|---|---|---|
| 5,669,040 A | 9/1997 | Hisatake | |
| 6,130,757 A | 10/2000 | Yoshida et al. | |
| 6,894,792 B1 | 5/2005 | Abe | |
| 2002/0112596 A1* | 8/2002 | Kondo | 84/609 |
| 2006/0279780 A1 | 12/2006 | Anno et al. | |
| 2008/0320406 A1* | 12/2008 | Fukada et al. | 715/766 |
| 2010/0182624 A1 | 7/2010 | Murakami | |
| 2013/0246973 A1 | 9/2013 | Tomiyasu et al. | |

FOREIGN PATENT DOCUMENTS

| | | |
|---|---|---|
| EP | 1143695 A2 | 10/2001 |
| JP | 2009-223529 A | 10/2009 |

* cited by examiner

*Primary Examiner* — Iriana Cruz
(74) *Attorney, Agent, or Firm* — Rabin & Berdo, P.C.

(57) ABSTRACT

A data processing device includes a first storing unit for storing a plurality of job definition data indicating content of processing corresponding to instructions in accordance with a series of operations by a user, a second storing unit for storing rule information indicating a rule for determining order of displaying a plurality of items of identification information respectively identifying the plurality of the job definition data, a updating unit for updating the rule information stored in the second storing unit, a control unit for determining the order of displaying the plurality of the items of the identification information in accordance with the rule information stored in the second storing unit, and a displaying unit for displaying the plurality of the items of the identification information in the order determined by the control unit.

11 Claims, 15 Drawing Sheets

FIG. 6

| NO. | FUNCTION | NAME | FUNCTION PRIORITY ORDER | DISPLAY PRIORITY ORDER |
|---|---|---|---|---|
| 1 | SCAN | #0001 Taro – Fine | NOT SET | 0 |
| 2 | FAX | #0003 Jiro – Normal | NOT SET | 0 |
| 3 | FAX | #0003 Jiro – Fine | NOT SET | 0 |
| 4 | FAX | #0004 Saburo – Fine | NOT SET | 0 |
| 5 | SCAN | #0002 Hanako – Normal | NOT SET | 0 |
| 6 | COPY | Simplex > Duplex Copy | NOT SET | 0 |

FIG. 10

| NO. | FUNCTION | NAME | FUNCTION PRIORITY ORDER | DISPLAY PRIORITY ORDER |
|---|---|---|---|---|
| 1 | SCAN | #0001 Taro – Fine | 2 | 2 |
| 2 | FAX | #0003 Jiro – Normal | 3 | 4 |
| 3 | FAX | #0003 Jiro – Fine | 3 | 5 |
| 4 | FAX | #0004 Saburo – Fine | 3 | 6 |
| 5 | SCAN | #0002 Hanako – Normal | 2 | 3 |
| 6 | COPY | Simplex > Duplex Copy | 1 | 1 |

KC — Sort by Mode (Scan~) △

F10-1 — Scan — #0001 Taro - Fine
F10-2 — Scan — #0002 Hanako - Normal
F10-3 — Fax — #0003 Jiro - Normal
F10-4 — Fax — #0003 Jiro - Fine
F10-5 — Fax — #0004 Saburo - Fine
F10-6 — Copy — Simplex > Duplex Copy

FIG. 15

| NO. | FUNCTION | FUNCTION PRIORITY ORDER |
|---|---|---|
| 1 | COPY | 3 |
| 2 | SCAN | 2 |
| 3 | FAX | 1 |

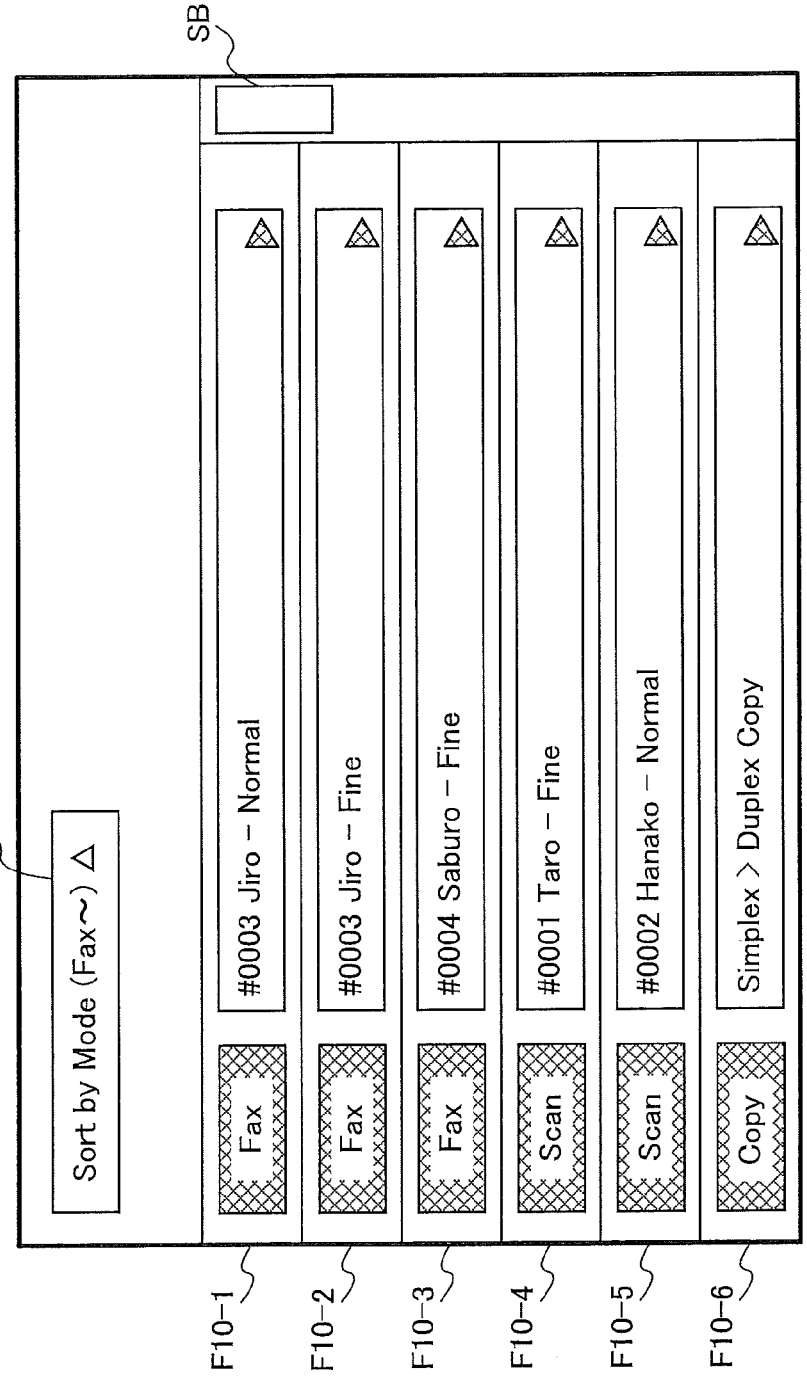

DATA PROCESSING DEVICE, IMAGE FORMING DEVICE, AND DATA PROCESSING METHOD

BACKGROUND OF THE INVENTION

1. Field of the Invention

The present invention relates to a data processing device, an image forming device, and a data processing method, and can be applied to a configuration of an operation screen of an MFP (multifunction peripheral), for example.

2. Description of the Related Art

A conventional image forming device or image processing device, such as an MFP, has a function to assign a sequence of a plurality of key operations to a single key operation and register the assignment. The key may be a hardware key or a software key.

A conventional MFP provides, by using a touch panel, an operation screen through which a user selects a job macro to be carried out.

An exemplary configuration of the above-mentioned screen for selecting a job is described in Japanese Patent Application Publication No. 2009-223529 (hereafter referred to as patent document 1). Patent document 1 describes an example of an operation screen on which a list of printing jobs for a printing control device is displayed. In the operation screen described in patent document 1, when the list of the printing jobs is displayed, a user can arbitrarily select one from parameters in relation to the respective printing jobs to change order of displaying the printing jobs.

However, in the operation screen described in patent document 1, when the number of items of parameters in relation to the printing jobs (i.e., the number of job definition data) is increased, it is complicated and inconvenient for the user to manually rearrange the order of displaying the printing jobs.

Thus, there is need for a data processing device, an image forming device and a data processing method that are more convenient when a user selects a job through an operation screen.

SUMMARY OF THE INVENTION

A data processing device according to an embodiment of the invention includes a first storing unit for storing a plurality of job definition data indicating content of processing corresponding to instructions in accordance with a series of operations by a user, a second storing unit for storing rule information indicating a rule for determining order of displaying a plurality of items of identification information respectively identifying the plurality of the job definition data, an updating unit for updating the rule information stored in the second storing unit, a control unit for determining the order of displaying the plurality of the items of the identification information in accordance with the rule information stored in the second storing unit, and a displaying unit for displaying the plurality of the items of the identification information in the order determined by the control unit.

According to an aspect of the present invention, it is possible to provide a data processing device, an image forming device and a data processing method that are more convenient when a user selects a job through an operation screen.

BRIEF DESCRIPTION OF THE DRAWINGS

In the attached drawings:

FIG. 6 is an explanatory diagram illustrating an example of a job macro management table file according to the embodiment;

FIG. 10 is an explanatory diagram illustrating an example of a transition of the job macro management table file according to the embodiment;

FIG. 11 is an explanatory diagram illustrating a first example of a transition of the job macro selection screen displayed in the MFP according to the embodiment;

FIG. 15 is an explanatory diagram illustrating a second example of a transition of the display rule information according to the embodiment; and FIG. 16 is an explanatory diagram illustrating a third example of a transition of the job macro selection screen displayed in the MFP according to the embodiment.

Figure 1:
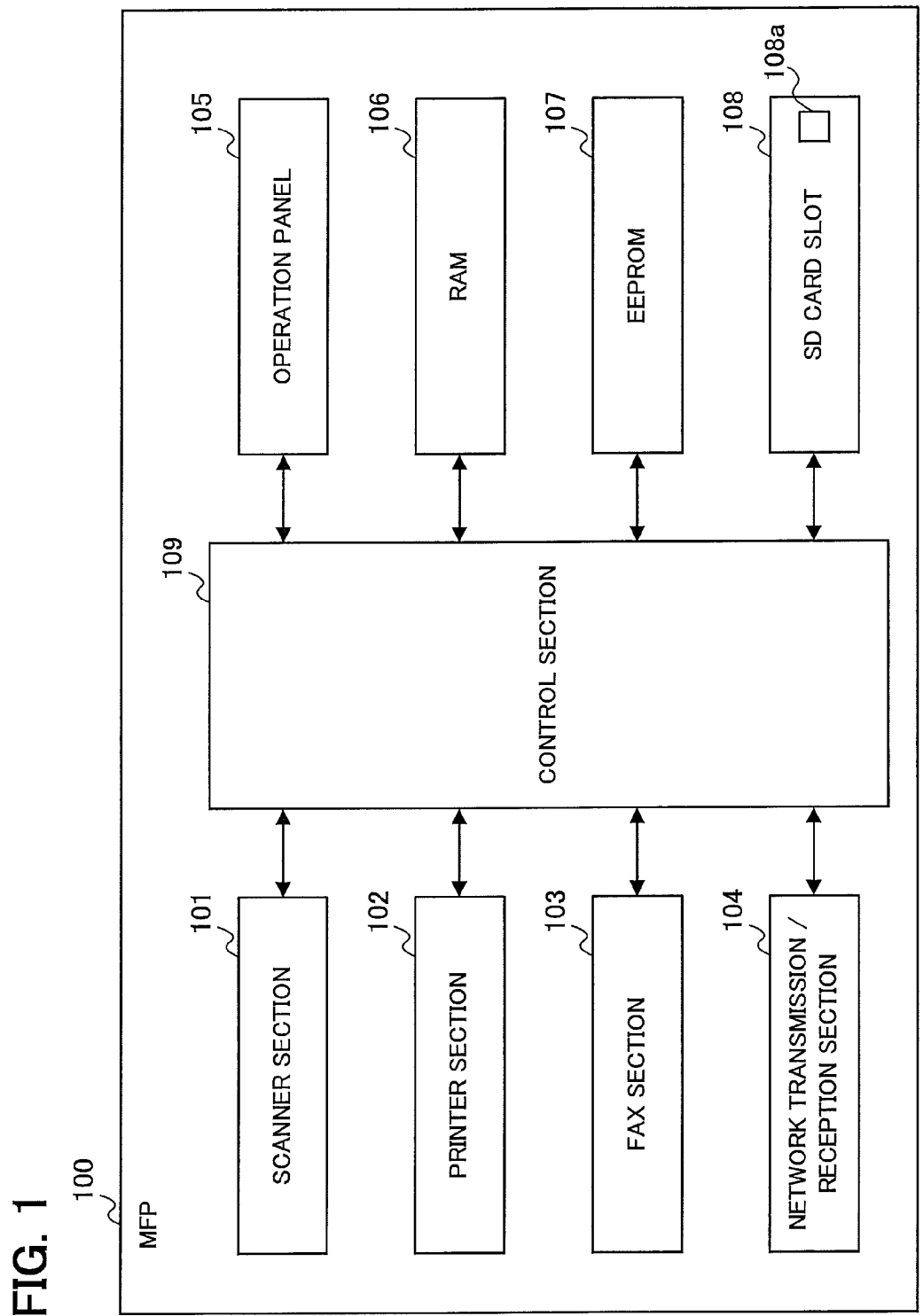
FIG. 1 is a block diagram illustrating a configuration of an MFP according to an embodiment.

DETAILED DESCRIPTION OF THE INVENTION (A) Main Embodiment

An embodiment of a data processing device, an image forming device and a data processing method according to the invention will now be described with reference to the attached drawings, in which like elements are indicated by like reference characters. In the following description, an example in which the image forming device that includes the data processing device of the invention is applied will be described.

(A-1) Configuration in the Embodiment

FIG. 1 is an explanatory diagram illustrating a functional configuration of an MFP 100 according to this embodiment.

The MFP 100 in this embodiment includes a scanner section 101, a printer section 102, a FAX (facsimile) section 103, a network transmission/reception section 104, an operation panel 105, a RAM (Random Access Memory) 106; an EEPROM (Electrically Erasable Programmable Read-Only Memory) 107, an SD (Secure Digital) card slot 108 (SD card 108a), and a control section 109.

The scanner section 101 scans an original document which is placed on a platen (flatbed) or fed by an automatic document feeder, generates image data from the scanned original document, and supplies the generated image data to the control section 109 (particularly, an image data processing unit 110).

The printer section 102 receives the image data supplied from the scanner section 101 or the network transmission/reception section 104 via the control section 109 (particularly, the image data processing unit 110), and performs processing of printing (forming an image) on printing paper (i.e., a medium).

For example, the printer section 102 receives the image data supplied from the scanner section 101 via the control section 109 (particularly, the image data processing unit 110), converts the received image data to the printing data, and performs processing of printing (processing of 'COPY function'). Further, when the control section 109 (particularly, the image data processing unit 110) receives printing-job data via the network transmission/reception section 104, the printer section 102 receives the printing-job data from the control section 109 (particularly, the image data processing unit 110), and performs printing processing. More specifically, the printer section 102 generates printing-image data on the basis of the supplied printing-job data, and performs processing of printing on printing paper (processing of 'PRINT function').

The FAX section 103 is connected to a telephone line (fax line) and performs 'FAX function' in the MFP 100. For example, The FAX section 103 receives the image data generated by the scanner section 101 via the control section 109 (particularly, the image data processing unit 110), and converts the supplied image data to facsimile data (signals for facsimile transmission) in a format that is transmittable by facsimile, and performs processing of facsimile transmission to the outside (for example, a telephone communication network) via the telephone line (processing of 'FAX function').

The operation panel 105 functions as a user interface in the MFP 100. More specifically, the operation panel 105 in this embodiment performs output of information to a user and reception of input from the user, using a touch panel display and hardware keys. A specific configuration of the operation panel 105 will be described later.

Next, a configuration of the control section 109 will be described.

Figure 2:
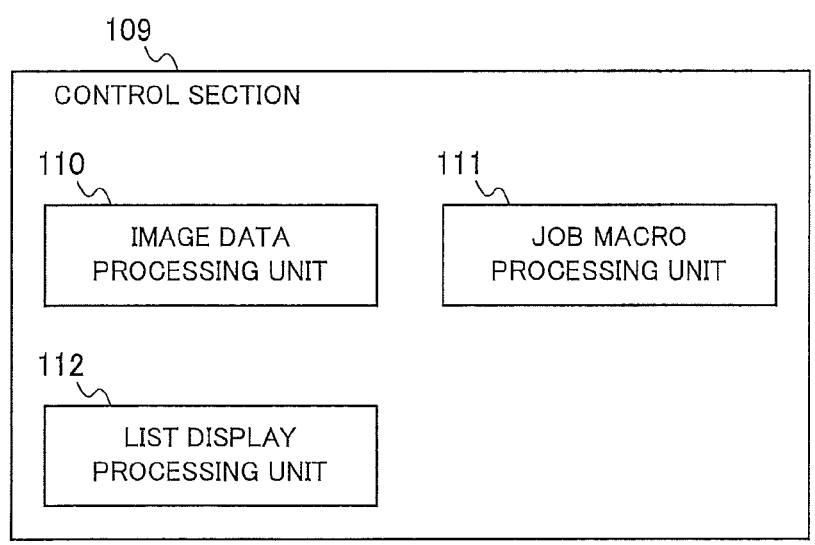
FIG. 2 is a block diagram illustrating a functional configuration of a control section according to the embodiment.

FIG. 2 is a block diagram illustrating a functional configuration (software configuration) of the control section 109.

The control section 109 controls processing of each element in the MFP 100 and includes the image data processing unit 110, a job macro processing unit 111, and a list display processing unit 112. The control section 109 can be configured, for example, by a computer which has a processor and the like executing a program. In this case, in this embodiment, a data processing program corresponds to a program which implements functions of at least the job macro processing unit 111 and the list display processing unit 112.

The data processing device in this embodiment can be configured by the job macro processing unit 111 and the list display processing unit 112. In other words, the data processing device in this embodiment can be configured by the computer in which the data processing program mentioned above is installed.

The image data processing unit 110 carries out various types of image processing in relation to the functions in the MFP 100. The image data processing unit 110 processes, for example, data supplied from the scanner section 101, the FAX section 103, the network transmission/reception section 104 or the like, in accordance with operations by the user, and supplies the processed data to another element. The image data processing unit 110 processes data supplied in accordance with operations by the user, and performs output processing in accordance with operations by the user.

The job macro processing unit 111 performs processing in relation to a job macro described below. In this embodiment, the 'job macro' means data of a macro (script) for executing a series of operations to perform processing based on each function in the MFP 100 (e.g., operation of hardware keys, software keys or the like). Hereinafter, the 'job macro' is also referred to as 'job macro file', 'job definition data', 'key macro', or 'job memory'. The job macro processing unit 111 processes a series of the key operations by the user, as the job macro (job macro file). In other words, the job macro (job macro file) may be defined as data that indicates content of processing corresponding to instructions in accordance with a series of the operations by the user. When the user uses a job of COPY function (hereinafter also referred to as 'COPY job'), the user usually need to perform manual operations (i.e., key operations) to set an enlargement/reduction ratio, the number of copies, printing density, or another item which is different from a default setting. However, if the job macro is registered in the MFP 100 in advance, it is possible to carry out a function simply by selecting the job macro, without complicated operations. In other words, the job macro indicates content of processing concerning functions of the image processing.

The job macro processing unit 111 performs registration, readout, editing, deletion and the like of the job macro (job macro file) in accordance with operations by the user. In this embodiment, when the job macro processing unit 111 receives instruction to register a certain job macro (job macro file) the job macro processing unit 111 stores data of the job macro (indicating a series of operations) in the SD card 108a, as a single job macro file. Moreover, the job macro processing unit 111 reads the job macro file stored in the SD card 108a in accordance with operations by the user, and then causes the image data processing unit 110 to perform processing on the basis of the read job macro file.

Details of a configuration of the list display processing unit 112 will be described later.

Next, a configuration example of the operation panel 105 will be described by referring to FIG. 3.

Figure 3:
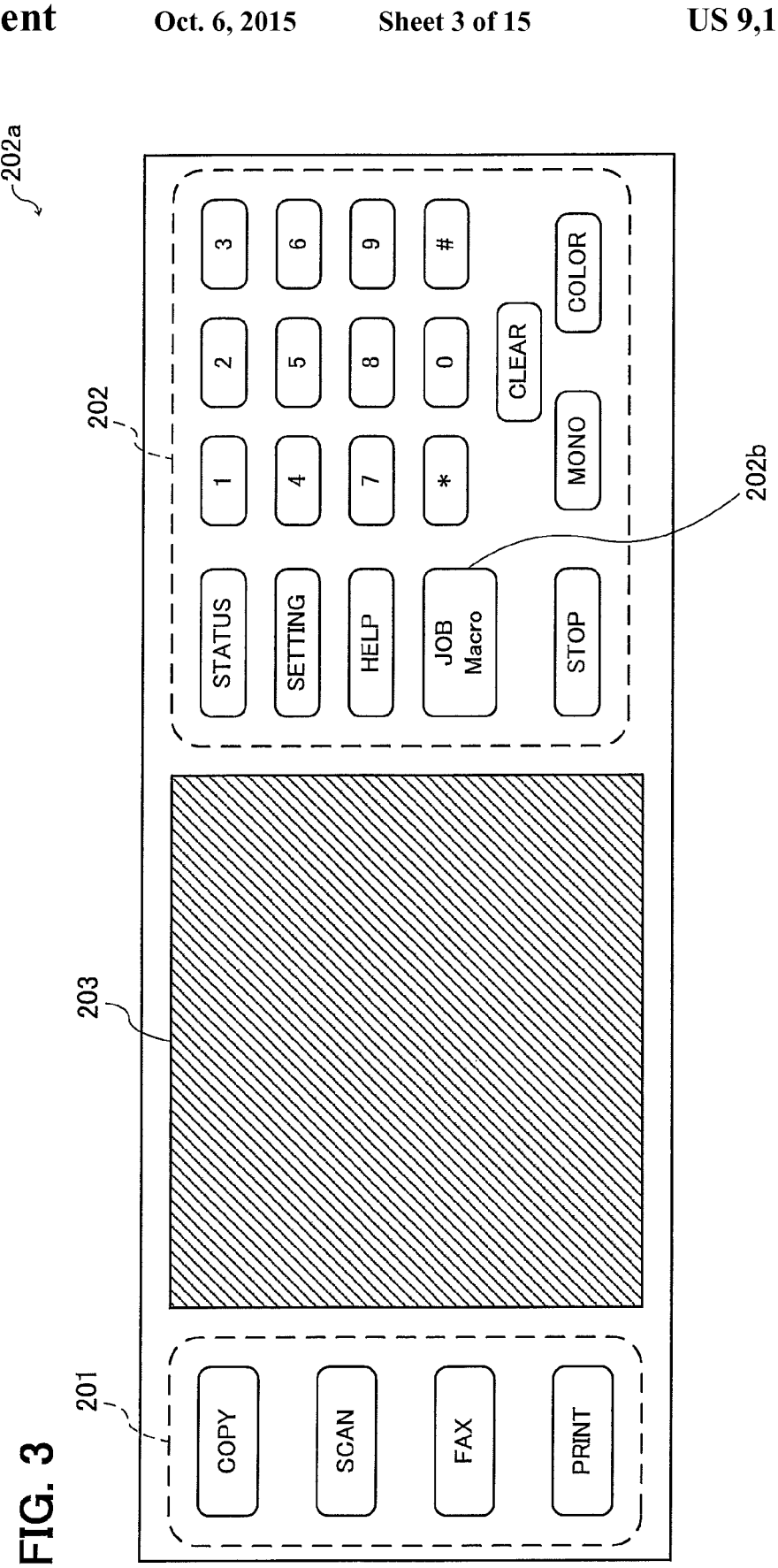
FIG. 3 is a plan view illustrating an operation panel according to the embodiment.

FIG. 3 is a plan view of the operation panel 105.

It is assumed that the operation panel 105 in this embodiment is mainly configured by a first hardware key unit 201, a second hardware key unit 202, and a touch panel unit 203.

The touch panel unit 203 is a device which can function as a display unit displaying an operation screen in accordance with control of the control section 109 on an LCD display, and an operation unit accepting operation by the user, such as pressing a software key on the operation screen. The touch panel unit 203 supplies the control section 109 with an operation signal based on the operations by the user, for example, information on a touched area and the like.

Each of the first hardware key unit 201 and the second hardware key unit 202 is configured by a plurality of hardware keys. The control section 109 receives an operation signal corresponding to pressing each key.

The first hardware key unit 201 includes keys (function keys) corresponding to the functions performed in the MFP 100. In the MFP 100, when any function key of the first hardware key unit 201 is pressed, the operation screen of the touch panel unit 203 accordingly changes to a screen for accepting operations for carrying out the function corresponding to the pressed key.

The first hardware key unit 201 includes a COPY-function key 201a, a SCAN-function key 201b, a FAX-function key 201c, and a PRINT-function key 201d corresponding to the COPY function, the SCAN function, the FAX function and the PRINT function respectively.

The second hardware key unit 202 at least includes a numeric keypad 202a for inputting numerals and a job macro key 202b for switching to a screen on which the job macro can be selected (hereinafter referred to as a 'job macro selection screen'), or the like.

Figure 4:
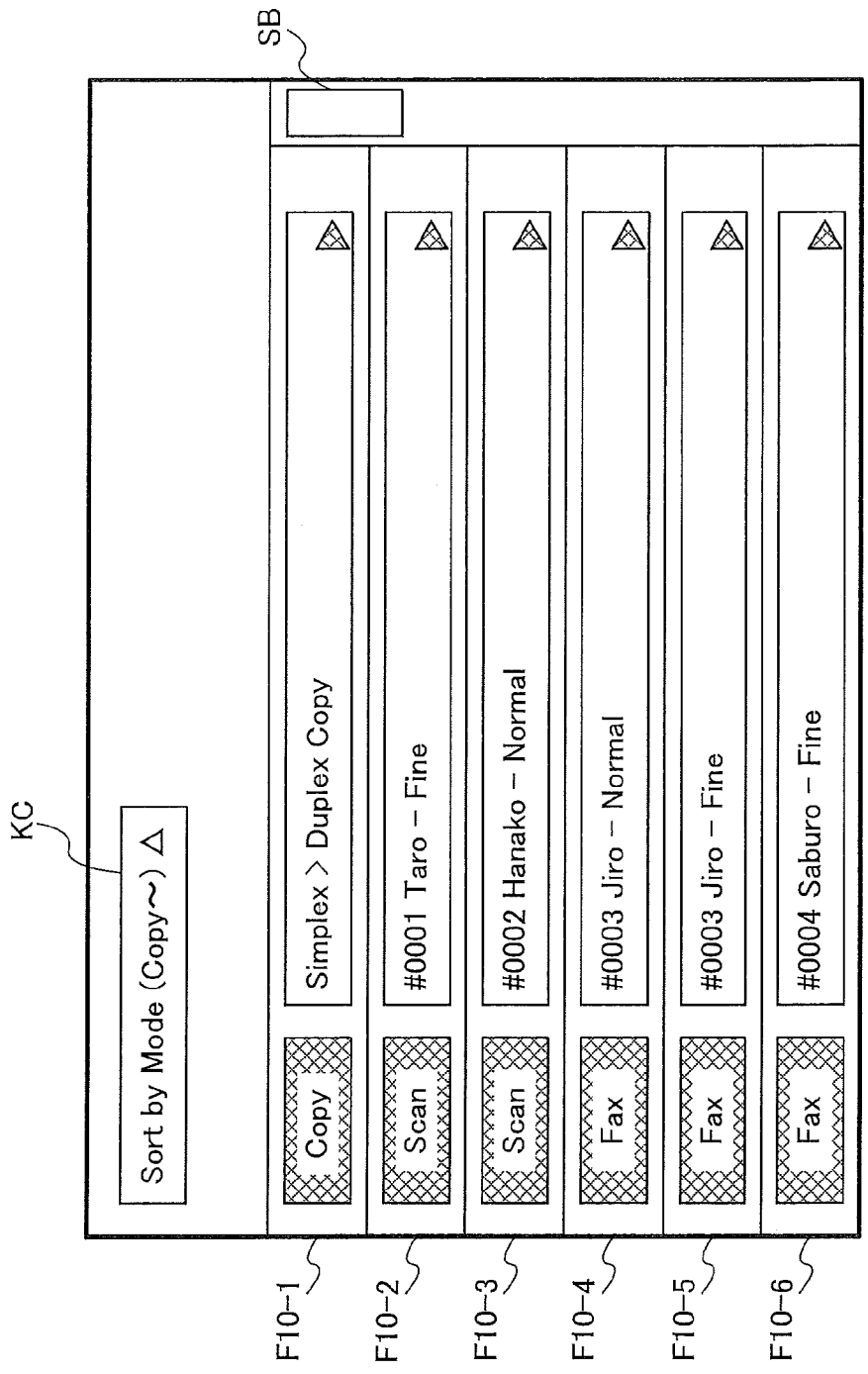
FIG. 4 is an explanatory diagram illustrating a layout example of a job macro selection screen displayed in the MFP according to the embodiment.

Next, a layout example of the job macro selection screen displayed on the touch panel unit 203 by pressing of the job macro key 202b will be described by referring to FIG. 4.

The job macro selection screen includes fields F10-1 to F10-6 used for displaying six job macros. Each of the fields F10-1 to F10-6 is an object which is capable of displaying information and accepting operations with regard to each job macro.

In other words, the job macro selection screen in this embodiment includes the six fields F10-1 to F10-6, and therefore is capable of displaying six items of identification information for identifying six job macros in a list at the same time.

In this embodiment, it is assumed that an operation key labeled with a function name and a job macro name as identification information for identifying the corresponding job macro in this order from the left, is placed in each of the fields F10-1 to F10-6. On the job macro selection screen, when one operation key labeled the job macro name in any field is pressed (selected), it is possible to carry out the job macro corresponding to the pressed key or to switch to an operation screen for carrying out this job macro.

The job macro selection screen also includes a scrollbar SB which enables to scroll the job macros displayed in the fields F10-1 to F10-6.

The job macro selection screen further includes a sort switching key KC for switching sort keys (display rules described below) for the job macros displayed in the fields F10-1 to F10-6. Details of functions of the sort switching key KC will be described below.

Figure 5:
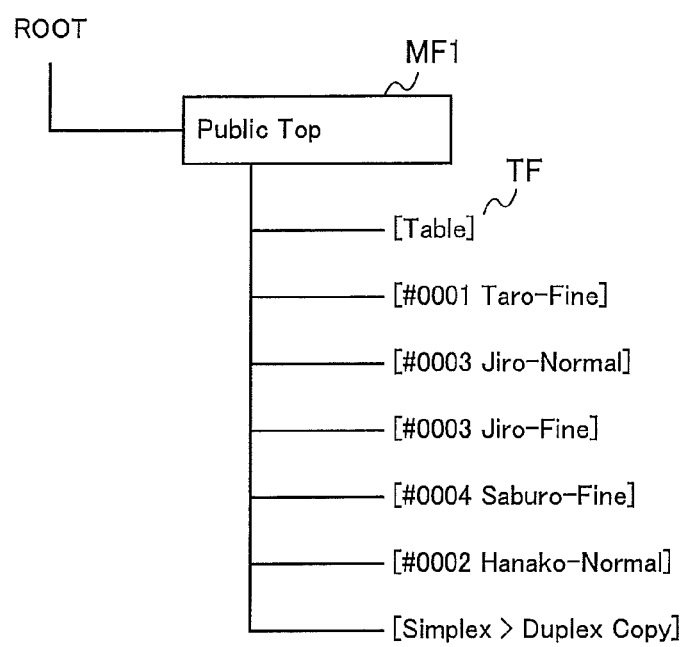
FIG. 5 is an explanatory diagram illustrating an example of a directory structure of a job macro file stored in an SD card according to the embodiment.

FIG. 5 is an explanatory diagram illustrating an example of a directory structure of a job macro file which is stored in the SD card 108a.

In this embodiment, description is given on the assumption that a FAT (File Allocation Table) file system is used in the SD card 108a.

As illustrated in FIG. 5, a main folder MF1 having a folder name 'Main Folder' and capable of storing a job macro file configured by data of a job macro is placed directly under a root directory. A plurality of main folders may be placed directly under the root directory, or a main folder may include sub folders. In this embodiment, in order to facilitate explanation, it is assumed that the single main folder MF1 with no sub folder is placed directly under the root directory, as illustrated in FIG. 5. As illustrated in FIG. 5, six job macro files and a job macro management table file TF holding data for managing these job macro files are placed directly under the main folder MF1.

In the job macro management table file TF, the job macro files under the main folder MF1 are managed.

The job macro management table file TF in the MFP 100 is configured as illustrated in FIG. 6.

As illustrated in FIG. 6, the job macro management table file TF stores information of the items of 'ID', 'function', 'name', 'function priority order' and 'display priority order', for each of the job macros (job macro files).

The item 'ID' indicates an identifier of each job macro in the job macro management table file TF. Basically, every time the job macro is registered in the main folder MF1, a number is assigned to the registered job macro as the ID in ascending order.

The item 'function' indicates the function corresponding to the job macro and contains the function (one of the COPY, FAX and SCAN functions) corresponding to the job macro. The item 'function' corresponds to the 'function' displayed in the fields F10-1 to F10-6 on the job macro selection screen.

The item 'name' indicates a name of the job macro. A file name of each job macro file is set to be the content of the item 'name'. The item 'name' corresponds to the 'job macro name' displayed in the fields F10-1 to F10-6 on the job macro selection screen.

The item 'function priority order' indicates a value according to the function (one of the COPY, FAX, and SCAN functions in this embodiment) corresponding to the job macro. In FIG. 6, all the values of the function priority order are set to initialized values ('not set'). The function priority order is set by the list display processing unit 112, which will be described later.

The item 'display priority order' indicates a value representing display priority in the order of displaying the job macros on the job macro selection screen. In this embodiment, it is assumed that, as the value of the display priority order set to a certain job macro becomes smaller, the priority given to this job macro becomes higher in the order of displaying. In other words, on the job macro selection screen, job macro names are displayed in the fields F10-1 to F10-6 in order of numbers of the display priority order (in ascending order). It is assumed that even if a display is scrolled thereafter, the job macro names are displayed in the display priority order on the job macro main screen. Also the item 'display priority order' is set by the list display processing unit 112, which will be described later. In FIG. 6, with respect to the all job macros, the values of the display priority order are set to initialized values (zero). The values of the display priority order are set by the list display processing unit 112, which will be described later.

The job macro management table file TF illustrated in FIG. 6 indicates content of the job macro management table file TF which is placed under the main folder MF1 as illustrated in FIG. 5.

It is assumed that, in the main folder MF1, the content of the job macro management table file and a storage structure (a directory structure) of the job macro files are synchronized. It is assumed that, in the MFP 100, in accordance with operation by the user, it is possible to register the job macro (job macro file) in the main folder MF1 and to update the content of the job macro management table file TF. In this regard, the same processing performed in various MFPs can be applied to the job macro registration processing, and therefore explanation of the processing of registering the job macro is omitted here.

Figure 7:
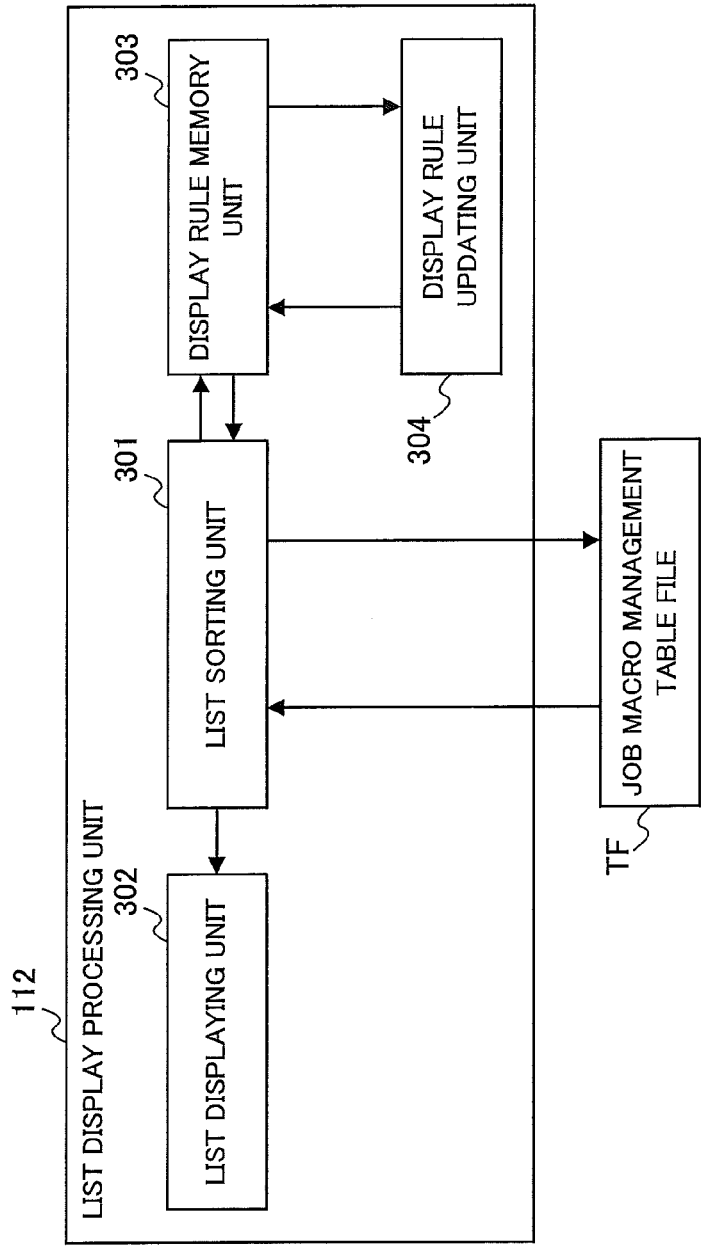
FIG. 7 is a block diagram illustrating a functional configuration of a list display processing unit according to an embodiment.

Next, details of a configuration of the list display processing unit 112 included in the control section 109 will be described by referring to FIG. 7.

The list display processing unit 112 includes a list sorting unit 301, a list displaying unit 302, a display rule memory unit 303, and a display rule updating unit 304.

The display rule memory unit 303 holds information which indicates a priority order of displaying the job macros managed in the job macro management table file TF. The information will be hereinafter referred to as 'display rule information'. In other words, the display rule information is rule information indicating a rule for determining a display order of a plurality of the job macro names.

Figures 8, 9:
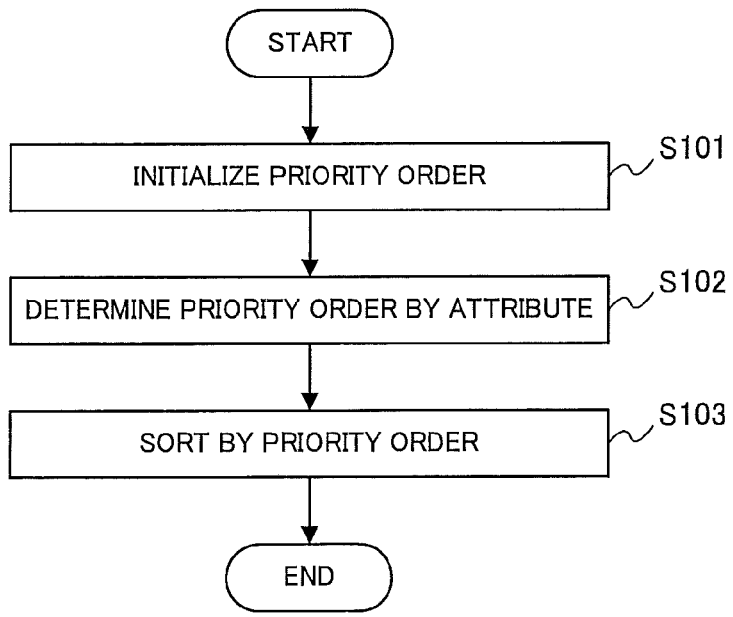
FIG. 8 is an explanatory diagram illustrating an example of display rule information according to the embodiment.
FIG. 9 is a flowchart illustrating processing of the list display processing unit in the MFP according to the embodiment.

FIG. 8 is an explanatory diagram illustrating an example of the display rule information stored in the display rule memory unit 303.

In the display rule information illustrated in FIG. 8, the function priority order of respective functions (the COPY, SCAN and FAX functions) corresponding to the job macro files is set. The function priority order indicates order of the functions displayed preferably in the upper part of the job macro selection screen. For example, since the COPY function is set as '1', the SCAN function is set as '2', and the FAX function is set as '3' in the function priority order in FIG. 8, the job macros are displayed on the job macro selection screen in the order of the COPY, SCAN and FAX function.

The display rule updating unit 304 updates the display rule information stored in the display rule memory unit 303. A trigger for and content of the update of the display rule information at the display rule memory unit 303 are not limited, but in this embodiment, the display rule updating unit 304 updates the display rule information in accordance with a predetermined rule, every time the sort switching key KC is pressed on the job macro selection screen. Moreover, in this embodiment, it is assumed that the display rule updating unit 304 is capable of changing content of the display rule information stored in the display rule memory unit 303 to arbitrary content in accordance with operations by the user. Details of the processing of updating the display rule information by the display rule updating unit 304 will be described later.

The list sorting unit 301 determines the order of displaying the job macros managed in the job macro management table file TF in accordance with the display rule information held in the display rule memory unit 303. More specifically, the list sorting unit 301 performs processing of changing the order of displaying the job macros managed in the job macro management table file TF (processing of sorting the values of the display priority order), according to a rule in accordance with the display rule information held in the display rule memory unit 303.

The list displaying unit 302 causes the operation panel 105 to display information of the job macros in the fields F10-1 to F10-6 in the order changed by the list sorting unit 301 (in the order managed in the job macro management table file TF).

As described above, in the MFP 100, the main folder MF1 in the SD card 108a functions as a job definition data memory unit. Moreover, in the MFP 100, the job macro management table file TF in the SD card 108a functions as a display order memory unit. Furthermore, in the MFP 100, the list display processing unit 112 (particularly, the list sorting unit 301) functions as a display order updating unit. Furthermore, in the MFP 100, the list display processing unit 112 (particularly, the display rule updating unit 304) functions as a priority order change accepting unit and a rule information updating unit. Furthermore, in the MFP 100, the image data processing unit 110 functions as an image processing unit. Moreover, in the MFP 100, the job macro processing unit 111 functions as a job processing unit. Moreover, in the MFP 100, each of the scanner section 101, the printer section 102, the FAX section 103 and the network transmission/reception section 104 functions as an image processing unit.

(A-2) Processing in the Embodiment

Next, processing of the MFP 100 which has the configuration described above in this embodiment will be described.

In the following description, processing related to the list display processing unit 112 will be mainly described, and explanation of other processing will be omitted.

FIG. 9 is a flowchart illustrating processing of displaying the job macro selection screen by the list display processing unit 112.

The processing of the flowchart of FIG. 9 is carried out, when the job macro selection screen is initially displayed on the touch panel unit 203, or when the sort switching key KC is pressed on the job macro selection screen and the display rule information in the display rule memory unit 303 is updated.

Firstly, the list display processing unit 112 (the list sorting unit 301) initializes the function priority order and the display priority order in the job macro management table file TF (S101). More specifically, the list display processing unit 112 (particularly, the list sorting unit 301) sets values of the function priority order to 'not set' and initializes values of the display priority order to '0', with regard to all the job macros.

In this example, as a result of the initialization of the function priority order and the display priority order in the job macro management table file TF, the job macro management table file TF illustrated in FIG. 6 is obtained.

Next, the list display processing unit 112 (particularly, the list sorting unit 301) reads the display rule information from the display rule memory unit 303, and updates the item 'function priority order' in the job macro management table file TF in accordance with the read display rule information (S102).

More specifically, the list display processing unit 112 (particularly, the list sorting unit 301) obtains values of the function priority order corresponding to the COPY, SCAN and FAX functions from the display rule memory unit 303, and sets the obtained values corresponding to the functions as the item 'function priority order' in the job macro management table file TF.

As a result of the update of the item 'function priority order' in the job macro management table file TF illustrated in FIG. 6 in accordance with the display rule information illustrated in FIG. 8, the job macro management table file TF illustrated in FIG. 10 is obtained. In FIG. 10, in accordance with the display rule information in FIG. 8, the values of the function priority order are set as follows: a job macro corresponding to the COPY function is set as '1'; job macros corresponding to the SCAN function are set as '2'; and job macros corresponding to the FAX function are set as '3'.

Next, the list display processing unit 112 (particularly, the list sorting unit 301) determines the display priority order for each of the job macros on the basis of the function priority order set in step S102 and the ID numbers, and sets it in the job macro management table file TF (S103).

More specifically, the list display processing unit 112 (particularly, the list sorting unit 301) sets a smaller value of the display priority order to a job macro which has a smaller value of the function priority order (i.e., a first property or a first sort key). When a plurality of the job macros have the same value of the function priority order, the list display processing unit 112 (the list sorting unit 301) sets a smaller value of the display priority order to one of the job macros which has a smaller value of the ID number (i.e., a second property or a second sort key). In other words, for the plurality of the job macros, the display priority order is set corresponding to ascending order of the ID numbers.

As a result of the update of the item 'display priority order' in the job macro management table file TF illustrated in FIG. 6, the job macro management table file TF illustrated in FIG. 10 is obtained.

In FIG. 10, the function priority order of the job macro identified by ID number 6 is the smallest value, and therefore the display priority order of this job macro is set '1'. In FIG. 10, the function priority order of the job macro identified by ID number 1 and the function priority order of the job macro identified by ID number 5 are the same. In this case, the job macro identified by ID number 1 is smaller in the registered number, and therefore this job macro is ranked next to the job macro identified by ID number 6 in the display priority order, and the display priority order of this job macro is set as '2'. In this way, the list display processing unit 112 (particularly, the list sorting unit 301) determines the display priority order for all the job macros.

Then, the list displaying unit 302 updates the order of displaying the job macros on the job macro selection screen in accordance with the display priority order sorted by the list sorting unit 301.

When the job macro management table file TF has the content illustrated in FIG. 10 as described above, the job macro selection screen illustrated in FIG. 5 is displayed by the touch panel unit 203.

In FIG. 5, the job macros are displayed in the fields F10-1 to F10-6 in order of the values of the display priority order in the job macro management table file TF.

Next, details of the processing in which the display rule updating unit 304 updates the display rule information stored in the display rule memory unit 303 will be described.

As described above, the display rule updating unit 304 updates the display rule information according to the predetermined rule, every time the sort switching key KC is pressed on the job macro selection screen.

More specifically, the display rule updating unit 304 updates the values of the display priority order of the respective functions cyclically (in rotation), every time the sort switching key KC is pressed.

More specifically, in a case where the display rule information in an initial state indicates that the function priority order is as follows: 'COPY: 1, SCAN: 2, FAX: 3' as illustrated in FIG. 8, when the sort switching key KC is once pressed, the display rule updating unit 304 cyclically shifts the function priority order one level to change the function priority order to the following order: 'COPY: 3, SCAN: 1, FAX: 2'. At the time, the display rule updating unit 304 changes a function name labeled on the sort switching key KC to a name of a function whose value of the function priority order is 1 ('SCAN'). Subsequent to the update of the display rule information by the display rule updating unit 304, the processing of the flowchart of FIG. 9 described above is carried out and the order of displaying the job macros on the job macro selection screen is sorted by the list display processing unit 112. As a result, the job macro selection screen illustrated in FIG. 11 is displayed. In FIG. 11, the job macros are sorted and displayed in the function priority order of 'SCAN', 'FAX' and 'COPY'.

Figure 12:
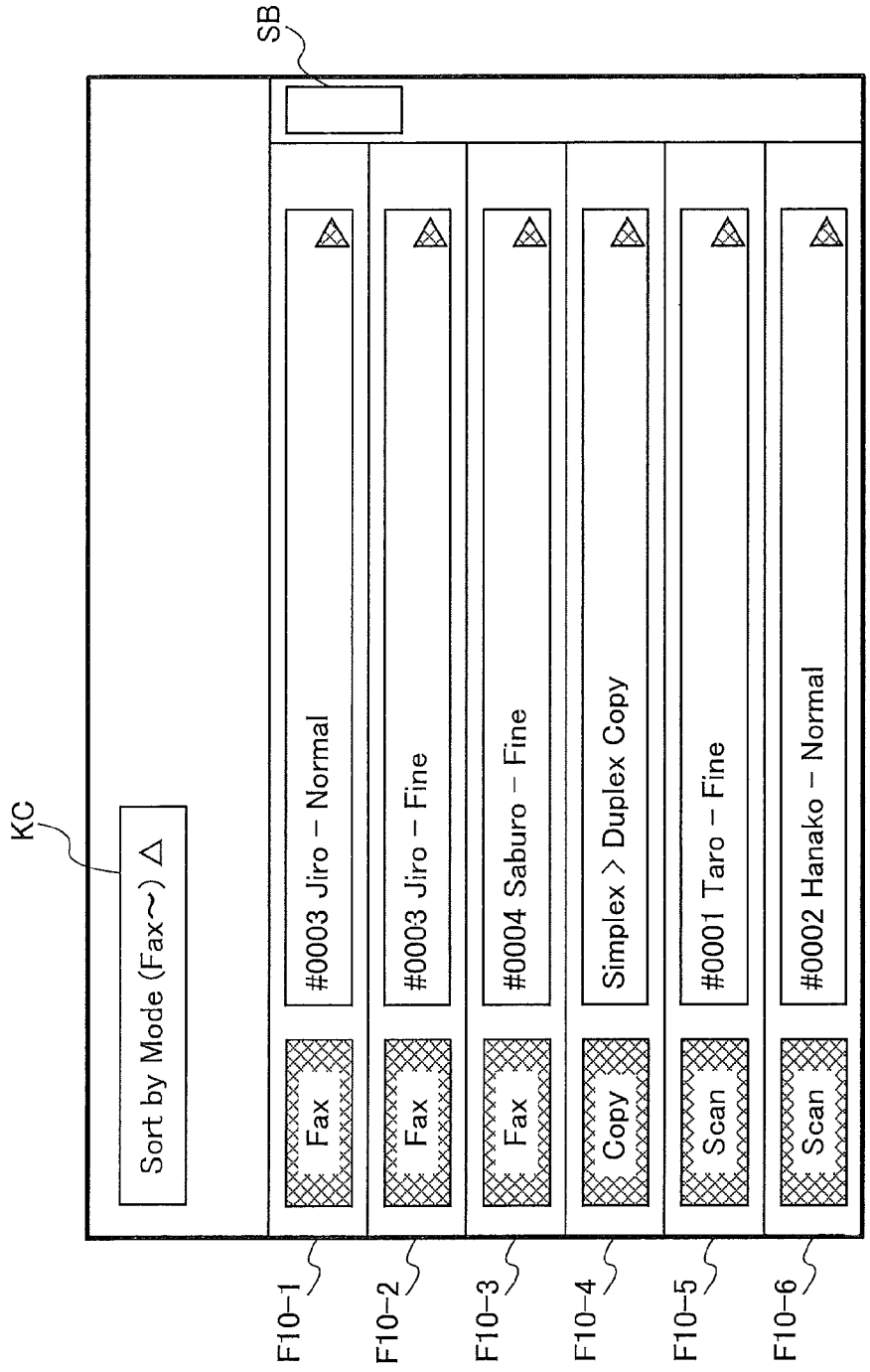
FIG. 12 is an explanatory diagram illustrating a second example of a transition of the job macro selection screen displayed in the MFP according to the embodiment.

When the sort switching key KC is pressed in a state where the job macro selection screen illustrated in FIG. 11 is displayed, the display rule updating unit 304 cyclically shifts the function priority order one more level to change the function priority order to the following order: 'COPY: 2, SCAN: 3, FAX: 1'. At the time, the display rule updating unit 304 changes a function name labeled on the sort switching key KC to a name of a function whose value of the function priority order is 1 ('FAX'). Subsequent to the update of the display rule information by the display rule updating unit 304, the processing of the flowchart of FIG. 9 described above is carried out and the order of displaying the job macros on the job macro selection screen is sorted by the list display processing unit 112. As a result, the job macro selection screen illustrated in FIG. 12 is displayed. In FIG. 12, the job macros are sorted and displayed in the function priority order of 'FAX', 'COPY' and 'SCAN'.

Then, when the sort switching key KC is pressed in a state where the job macro selection screen illustrated in FIG. 12 is displayed, the display rule updating unit 304 cyclically shifts the function priority order one more level to change the function priority order to the following order: 'COPY: 1, SCAN: 2, FAX: 3'. It means that the function priority order returns to the initial state. Thus, as a result, the content of the job macro selection screen returns to FIG. 5.

Next, processing in which the display rule updating unit 304 changes the function priority order in the display rule information stored in the display rule memory unit 303 to an arbitrary order in accordance with operations by the user will be described. On the job macro selection screen, the function priority order can be cyclically shifted, however, cannot be changed to another arbitrary order. So, in this embodiment, the function priority order can be changed to an arbitrary order by the display rule updating unit 304, through an operation screen illustrated in FIG. 13 (hereinafter referred to as a 'function priority order change accepting screen').

In addition, in the MFP 100, a way to invoke the function priority order change accepting screen is not limited. The function priority order change accepting screen may be invoked by pressing a predetermined hardware key or operating a menu.

Figure 13:
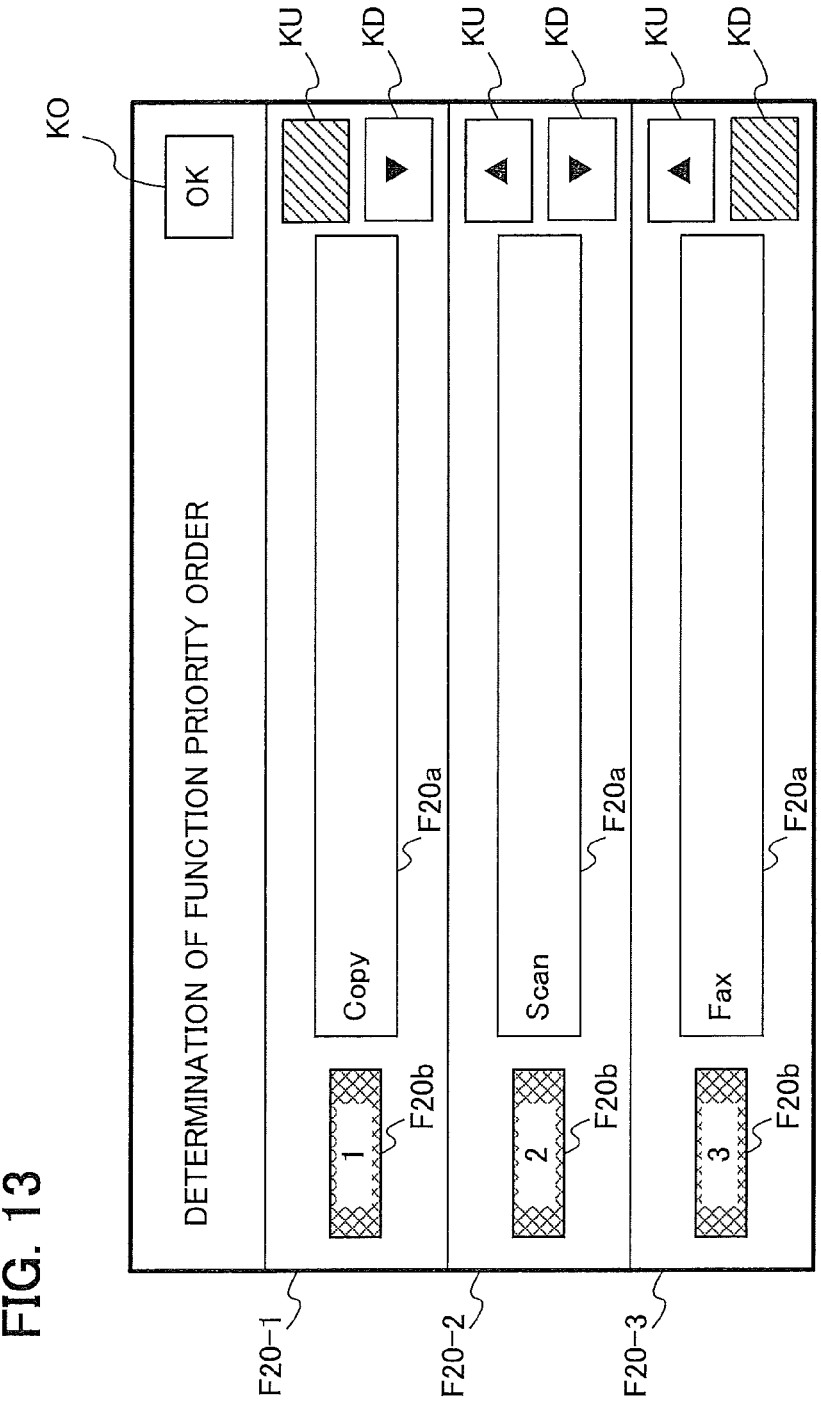
FIG. 13 is an explanatory diagram illustrating an example of a function priority order change accepting screen displayed in the MFP according to the embodiment.

On the function priority order change accepting screen, as illustrated in FIG. 13, the functions are assigned to fields F20-1 to F20-3 in a descending order of the function priorities. In FIG. 13, the function priority order is the following order: 'COPY: 1, SCAN: 2, FAX: 3', and therefore the COPY function is assigned to the field F20-1; the SCAN function is assigned to the field F20-2; and the FAX function is assigned to the field F20-3. On the function priority order change accepting screen, as illustrated in FIG. 13, each of the fields F20-1 to F20-3 includes a subfield F20a displaying the name of the function assigned to the relevant field, a subfield F20b displaying a current rank of the function assigned to the relevant field in the function priority order, a key KU for raising the current rank of the function assigned to the relevant field one level in the function priority order (reducing one from the value of the function priority order), and a key KD for lowering the current rank of the function assigned to the relevant field one level in the function priority order (adding one to the value of the function priority order). FIG. 13 illustrates an example in which the function priority order is the following order: 'COPY: 1, SCAN: 2, FAX: 3'. When the key KU of the field F20-2 is pressed, the function priority order of the COPY function and the SCAN function is reversed, and the function priority order is changed to the following order: 'SCAN: 1, COPY: 2, FAX: 3'.

Since the rank of the function corresponding to the field F20-1 is '1' in the function priority order and cannot be further moved up in the order, the key KU corresponding to the field F20-1 does not function (i.e., the key cannot be pressed). Since the rank of the function corresponding to the field F20-3 is '3' in the function priority order and cannot be further moved down in the order, the key KD corresponding to the field F20-3 does not function (i.e., the key cannot be pressed). In addition, the keys which do not function (i.e., which cannot be pressed) are marked by hatching in FIG. 13, and may preferably be marked using a different manner such as graying out and the like.

The function priority order change accepting screen also includes an OK key KO for updating the display rule information stored in the display rule memory unit 303 according to the order currently displayed in the fields F20-1 to F20-3.

Thus, on the function priority order change accepting screen, each function can be set in an arbitrary function priority order, and the arbitrary function priority order can be reflected in the display rule information stored in the display rule memory unit 303.

Figure 14:
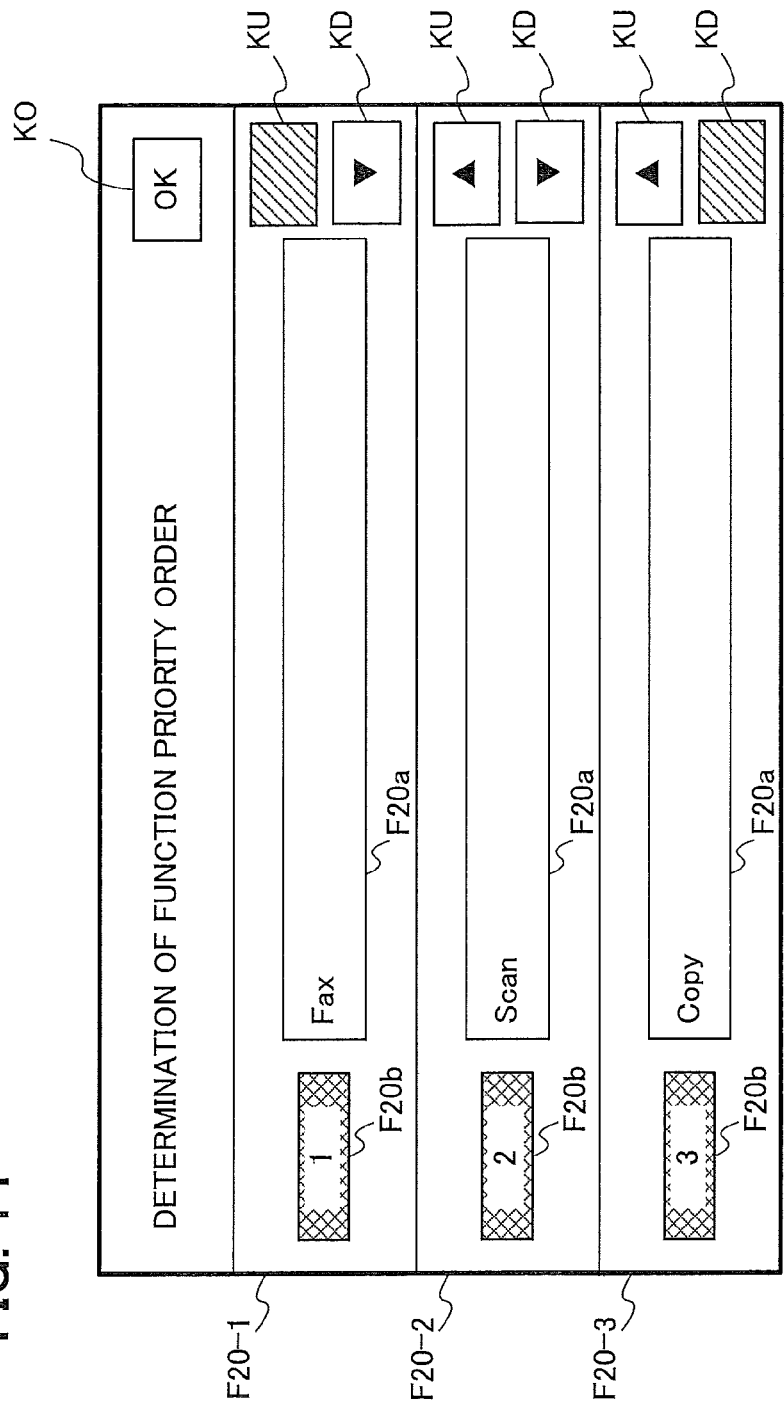
FIG. 14 is an explanatory diagram illustrating a first example of a transition of the function priority order change accepting screen displayed in the MFP according to the embodiment.

Therefore, on the function priority order change accepting screen, by operating the key KU or KD of each of the fields F20-1 to F20-3, the function priority order can be set as order which cannot be implemented by only cyclically shifting, like 'FAX: 1, SCAN: 2, COPY: 3' as illustrated in FIG. 14.

When the function priority order change accepting screen illustrated in FIG. 14 is displayed and the OK key KO is pressed, the display rule updating unit 304 updates the display rule information stored in the display rule memory unit 303 by changing the function priority order included in the display rule information to the order currently displayed in the fields F20-1 to F20-3.

As a result, the display rule information in the display rule memory unit 303 changes to that illustrated in FIG. 15.

After the update of the display rule information stored in the display rule memory unit 303, the job macro selection screen illustrated in FIG. 16 is displayed by the touch panel unit 203. In FIG. 16, the job macros are sorted and displayed in the function priority order of 'FAX', 'SCAN' and 'COPY'.

(A-3) Advantageous Effects According to the Embodiment

According to this embodiment, the following effects can be obtained.

In the MFP 100 according to this embodiment, even if a lot of job macros are stored, the list of the job macros can be displayed on the job macro selection screen in order of priorities which are assigned to the respective functions in accordance with the functions as the properties for the job macros.

Moreover, in the MFP 100, since the priorities of the functions can be cyclically shifted by the simple operations (i.e., only by pressing the sort switching key KC), it is possible to display the function that the user want to use in priority to the other functions, and the user can easily select the job macro that the user want to use.

Furthermore, in the MFP 100, the function priority order can be set as desired by the user through the function priority order change accepting screen, and therefore it is possible to set the function priority order freely. In addition, since it is possible to display the job macro of the function desired by the user in priority to the other job macros, in a state where the list of the job macros is initially displayed, further improvement in convenience can be implemented.

(B) Other Embodiments

The invention is not limited to the embodiment described above, and modified embodiments given as examples below can be presented.

(C-1) Although the embodiment described above is an example in which the data processing device of the invention is applied to the image forming device (MFP) in which job macros are managed by using a job macro file, the invention may be applied to a device (a printer, a facsimile, or an information processing device (a data processing device) such as a PC) in which file management is performed by using another file system. Furthermore, the invention may be applied to an image forming device.

(C-2) In the embodiment described above, the list display processing unit 112 uses the functions corresponding to the job macros as the first property (i.e., the first sort key) and ID numbers corresponding to job macros as the second property (i.e., the second sort key) for sorting. Although the second property (the second sort key) is fixed to the ascending order of the ID numbers in the embodiment described above, switching between the descending order and the ascending order may be enabled by setting a plurality of sort switching keys KC on the job macro selection screen, for example. Alternatively, another property may be used as the second property, for example, alphabetical order of file names, order of time stamps of job macro files and the like. Thus, in the list display processing unit 112, the number of the properties (sort keys) used for sorting may be plural and the number of the properties is not limited (and therefore three or more sort keys may be used for sorting). In a case where sorting is carried out by the list display processing unit 112 by using two or more properties (sort keys), sort switching keys KC whose number is the same as the number of the properties (i.e., the sort keys) may be placed on the job macro selection screen. In this case, display rule information on each property may be stored in the display rule memory unit 303 to define a display rule.

(C-3) In the MFP 100 according to the embodiment described above, although the example in which the display rule information stored in the display rule memory unit 303 is used without changing from the display rule information at a time when the job macro selection screen is initially displayed, the display rule information which is initially displayed may be dynamically changed. For example, the display rule information is updated on the basis of a use history of the job macros. More specifically, when the job macro selection screen is displayed in the MFP 100, the display rule information stored in the display rule memory unit 303 may be changed by the display rule updating unit 304 so that the function corresponding to processing which is most recently carried out (regardless of whether it is processing performed by using a job macro or processing performed without a job macro) may be ranked as '1' in the function priority order, and then the changed display rule information may be displayed.

What is claimed is:

1. A data processing device comprising:
    a first storing unit for storing a plurality of job definition data indicating content of processing corresponding to instructions in accordance with a series of operations by a user, the processing concerning one function of a plurality of functions of image processing, the job definition data having a function property indicating the one function;
    a second storing unit for storing rule information indicating a rule for determining order of displaying a plurality of items of identification information respectively identifying the plurality of the job definition data, the rule having function priority order indicating displaying order for each function property;
    an operation unit for accepting operation by the user;
    an updating unit for updating the rule information stored in the second storing unit in accordance with the operation accepted by the operation unit;
    a control unit for determining the order of displaying the plurality of the items of the identification information in accordance with the displaying order for each function property indicated by the function priority order; and
    a displaying unit for displaying the plurality of the items of the identification information in a list in the order determined by the control unit and displaying a sort switching key together with the list, the items of the identification information being sorted by the function property in accordance with the displaying order for each function property; wherein
    when the operation unit accepts the operation to press the sort switching key, the updating unit changes the displaying order for each function property;
    the control unit determines again the order of displaying the plurality of the items of the identification information in accordance with the changed displaying order for each function property; and
    the order of the items of the identification information in the list displayed by the displaying unit is changed by the function property in accordance with the order determined again by the control unit.

2. The data processing device according to claim 1, wherein the functions of the image processing include at least one of a SCAN function, a FAX function, a COPY function and a PRINT function.

3. The data processing device according to claim 1, wherein the updating unit updates the rule information stored in the second storing unit in accordance with a use history of the job definition data.

4. An image forming device comprising:
a first storing unit for storing a plurality of job definition data indicating content of processing corresponding to instructions in accordance with a series of operations by a user, the processing concerning one function of a plurality of functions of image processing, the job definition data having a function property indicating the one function;
a second storing unit for storing rule information indicating a rule for determining order of displaying a plurality of items of identification information respectively identifying the plurality of the job definition data, the rule having function priority order indicating displaying order for each function property;
an operation unit for accepting operation by the user;
an updating unit for updating the rule information stored in the second storing unit in accordance with the operation accepted by the operation unit;
a control unit for determining the order of displaying the plurality of the items of the identification information in accordance with the displaying order for each function property indicated by the function priority order; and
a displaying unit for displaying the plurality of the items of the identification information in a list in the order determined by the control unit and displaying a sort switching key together with the list, the items of the identification information being sorted by the function property in accordance with the displaying order for each function property; wherein
when the operation unit accepts the operation to press the sort switching key, the updating unit changes the displaying order for each function property;
the control unit determines again the order of displaying the plurality of the items of the identification information in accordance with the changed displaying order for each function property; and
the order of the items of the identification information in the list displayed by the displaying unit is changed by the function property in accordance with the order determined again by the control unit.

5. A data processing method comprising:
determining order of displaying a plurality of items of identification information for identifying each of a plurality of job definition data indicating content of processing corresponding to instructions in accordance with a series of operations by a user in accordance with rule information indicating a rule for determining the order of displaying the plurality of the items of identification information, the processing concerning one function of a plurality of functions of image processing, the job definition data having a function property indicating the one function, the rule having function priority order indicating displaying order for each function property;
displaying the plurality of the items of the identification information in a list in the determined order and a sort switching key together with the list, the items of the identification information being sorted by the function property in accordance with the displaying order for each function property;
accepting operation to press the sort switching key by the user;
updating the rule information to change the displaying order for each function property in accordance with the accepted operation;
determining again the order of displaying the plurality of the items of the identification information in accordance with the changed displaying order for each function property; and
displaying the plurality of the items of the identification information in the order determined again.

6. The data processing device according to claim 1, wherein:
the job definition data having a second property, second displaying order being assigned to the second property;
the control unit determines the order of displaying the plurality of the items of the identification information in accordance with the displaying order for each function property and the second displaying order; and
the displaying unit displays a second sort switching key for changing the second displaying order together with the list.

7. The data processing device according to claim 1, wherein:
the job definition data having a plurality of second properties, second displaying order is assigned to one property out of the plurality of second properties;
the one property as a target to that the second displaying order is assigned can be changed with another property out of the second properties.

8. The data processing device according to claim 7, wherein the plurality of second properties are an identifier of the job definition data, a file name of the job definition data, and a time stamp of the job definition data.

9. The data processing device according to claim 1, wherein the updating unit updates the rule information so that the function priority order corresponding to processing that is most recently carried out is changed to the highest priority in the function priorities.

10. The data processing device according to claim 1, wherein the updating unit updates the rule information so that the function priority order corresponding to processing that is most recently carried out by using the job definition data is changed to the highest priority order in the function priorities.

11. The data processing device according to claim 1, wherein the updating unit updates the rule information so that the function priority order corresponding to processing that is most recently carried out without using the job definition data is changed to the highest priority order in the function priorities.

* * * * *